Nov. 25, 1969   F. F. WHITE ET AL   3,480,159
BAR AND TUBE FEEDER FOR AUTOMATIC MACHINES
Filed Nov. 22, 1966   9 Sheets-Sheet 1

INVENTORS.
F. F. WHITE,
N. J. TANNO &
E. T. CHIPPS
BY
McCoy, Greene & Te Grotenhuis
ATTORNEYS

INVENTORS.
F. F. WHITE,
N. J. TANNO &
E. T. CHIPPS
BY
McCoy, Greene & Te Grotenhuis
ATTORNEYS

FIG. 18

United States Patent Office 3,480,159
Patented Nov. 25, 1969

3,480,159
**BAR AND TUBE FEEDER FOR
AUTOMATIC MACHINES**
Frank F. White, Shaker Heights, Norman J. Tanno, Kirtland, and Elmer T. Chipps, Mentor-on-the-Lake, Ohio, assignors to Automation Development Corporation, Mentor, Ohio, a corporation of Ohio
Filed Nov. 22, 1966, Ser. No. 600,350
Int. Cl. B23q 5/22; B23b 13/00
U.S. Cl. 214—1.2                                    35 Claims

ABSTRACT OF THE DISCLOSURE

A narrow bar feeder having a reciprocating continuous chain conveyor mounted on a long box beam and spaced removable bar-receiving carriers spaced along the chain and having escapement means for repeatedly feeding bars laterally to a central position on the carriers. A retractable capping bar is provided above the bar on the carriers to prevent whipping of the bar during high speed rotation, and a pusher rod is mounted on the chain to move under the capping bar, said pusher having feed fingers for gripping the bar as it is advanced and retracted.

---

The present invention relates to apparatus for feeding wires, bars or tubes to automatic or semi-automatic machines, such as automatic screw machines, cut-off machines, milling machines, threading machines, grinders, lathes, etc. and more particularly to an automatic bar feeder having a continuous chain conveyor and capping means to control whipping during high speed rotation of the work.

For more than a decade prior to this invention, it has been conventional to provide long stock-bar feeding tubes for automatic screw machines or other metal working machines to prevent violent whipping or vibration of the bar stock when it is rotated at high speeds. In some cases the feed tube of such bar feeders was formed in segments and/or provided with a lengthwise slot which could be opened and closed to permit loading of the bar stock from the top or side of the tube as disclosed, for example, in U.S. Patent No. 2,577,203.

The side loading of segmental feed tubes in such prior art bar feeding machines permitted faster loading of the screw machines but required equipment which was expensive and which required extensive modification to permit handling of different types of bar stock. Substantial changes in the diameter of the bar stock, for example, required expensive and time consuming replacement of the feed tubes.

The objects of the present invention are to overcome the deficiencies of such prior art bar feeding machines and to provide a simple reliable bar and tube feeder which can be manufactured economically and which will easily handle bar stocks having a large number of different sizes and shapes. These objects are accomplished by use of a continuous chain conveyor having bar-receiving carriers thereon, a pushing device for advancing each bar or tube into a metal working machine, and a capping assembly for limiting movement of the bar away from the carriers to avoid excessive whipping or vibration of the bar when it is rotated at high speeds. Such speeds often exceed 10,000 revolutions per minute. An escapement assembly or magazine feed is provided to allow one bar to move onto the carriers at the beginning of each cycle.

Such capping assembly may be in the form of a long capping bar shaped to fit over the bar stock and adapted to be positioned directly over the bar stock on the carriers to prevent such whipping. The capping bar usually has a central groove to receive the bar stock and to receive the upper portion of the pushing device as it is advanced by the chain. Since the pusher moves in unison with the carriers, it need not be shaped to pass through the carriers (or through a feed tube as in the prior art constructions). Conversely, the carriers need not be shaped to receive the pusher but may be provided with any desired shape to receive the bar stock. The carriers can be shaped to receive flat, square or polygonal bars as well as round bars. They can easily be removed from the chain and replaced without replacing the pusher.

Many different types of bars can be handled by the feeder of this invention without replacing the capping bar, and the size of the bars may vary considerably without even changing the carriers on the chain. For example, when using a generally V-shaped carrier having a small central groove, it is possible to handle round bars with diameters up to 1½ inches or so as well as small diameter bars.

Because of the bar feeder this invention is open under the bar stock and between the carriers on the chain, it is possible to effect removal of bars or remnants laterally or vertically in a manner which would be impossible or impractical in the prior art segmental feed tubes. Also, the shavings, grease and other foreign material falls out of the machine before it causes wear or scratching of the parts.

The use of the conveyor chain to support the bar stock also permits use of a unique pusher rod which extends a substantial distance over the end of the feeder into the automatic screw machine. This makes it easier to minimize the size of the remnant or remove the remnant.

Excellent results are also obtained in the machine of this invention when the continuous capping bar is replaced with a capping assembly having a series of spaced hold-down members adapted to be positioned above and adjacent the top of the bar stock on the carriers. Such hold down members may be mounted on an endless chain conveyor located directly above the carriers of said first-mentioned conveyor and may be moved independently of the latter conveyor. The capping assembly employing such an upper conveyor system requires more equipment than the assembly employing a continuous capping bar and is more expensive and more difficult to construct, but it has distinct advantages. For example, by placing a stop on the upper conveyor, such conveyor can be used to assist in forcing the bar stock into the gripping fingers of the pusher.

The machine of the present invention also has an improved escapement mechanism which can easily be adjusted to handle large numbers of different sizes and shapes of bar stock. For example, it is well suited for handling flat or round stock or stock having square, hexagonal or half-moon shape.

The frame used on the machine of this invention has a unique construction which provides very long, narrow machines which can be manufactured at low cost and which have exceptional strength and rigidity. Prior to this invention, bar feeders of long, narrow shape have required as many as 5 legs in order to provide adequate resistance to deformation of the parts, and it has been extremely difficult to ship the machines without damaging them. This problem has been solved by the use of a box beam which makes it possible to reduce the number of legs to two for the vast majority of the machines. Prior to this invention, the machine frames have usually been castings to provide the necessary rigidity at reasonable cost. Other frames of welded construction have also been used, but the welding operations greatly increase the cost of manufacture. The present invention solves the problem by using an unusual type of beam which has been known for more than a decade for other uses. It involves a unique use of such box beam which greatly improves the frame construction of this invention while at the same time greatly reducing the cost of manufacture.

An object of the present invention is to provide a bar and tube feeder which is more reliable than previously known feeders and can be manufactured at lower cost.

A further object of the invention is to provide a bar feeder which can handle bars of greatly varying sizes and shapes without requiring extensive changes in the machine.

A still further object of the invention is to provide a more reliable escapement mechanism for bar feeders which is simple and inexpensive to manufacture and can readily be adjusted to accommodate bars and tubes of widely varying cross section.

Another object of the invention is to reduce the width of a long bar feeding apparatus and to reduce the number of legs while at the same time providing improved rigidity in the frame.

Another object of the invention is to provide a bar feeder capable of handling relatively long bars or remnants and able to eject them laterally from the side of the feeder after they have been withdrawn from the automatic screw machine or other metal working machine.

Another object of the invention is to provide an improved means for removing remnants from a bar feeder after the remnant has been retracted.

These and other objects, uses and advantages of the invention will become apparent to those skilled in the art from the following description and claims and from the drawings in which:

Figure 1:
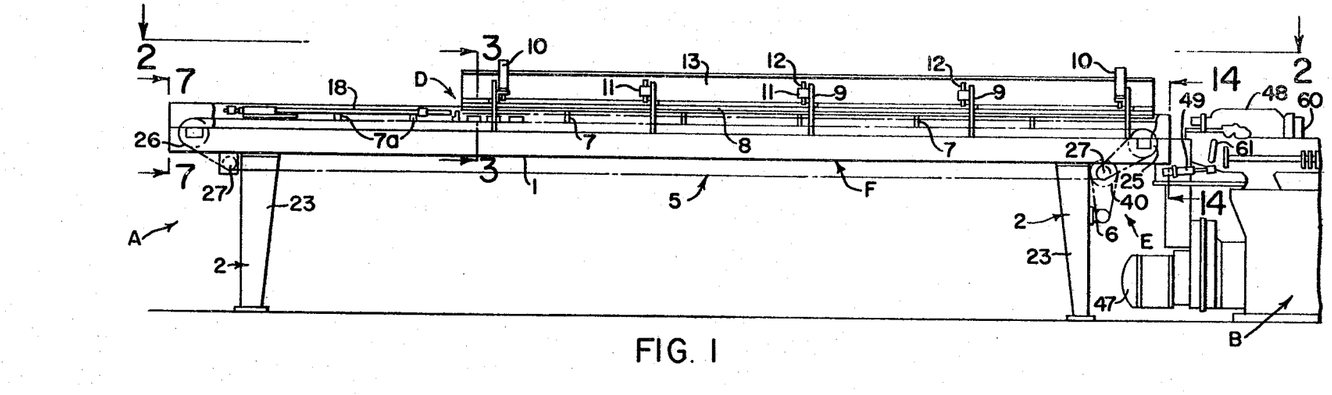
FIGURE 1 is a side elevational view on a reduced scale with parts omitted and parts broken away, showing a bar and tube feeder constructed according to the present invention and mounted for use with an automatic screw machine.
Figure 2:
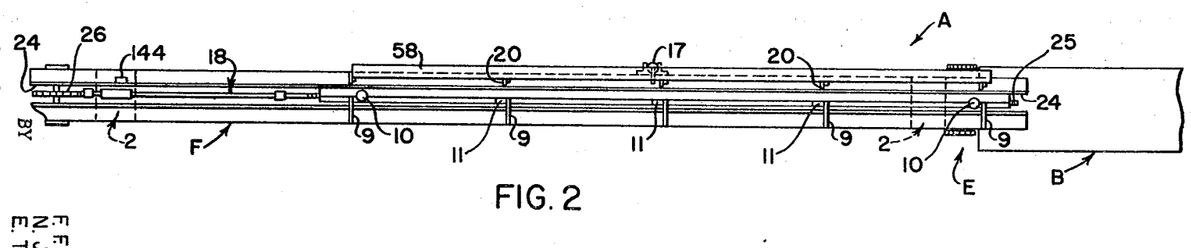
FIGURE 2 is a top plan view of the machine of FIGURE 1 on the same scale looking in the direction of the arrows 2—2 in FIGURE 1, the screw machine being shown diagrammatically.
Figure 3:
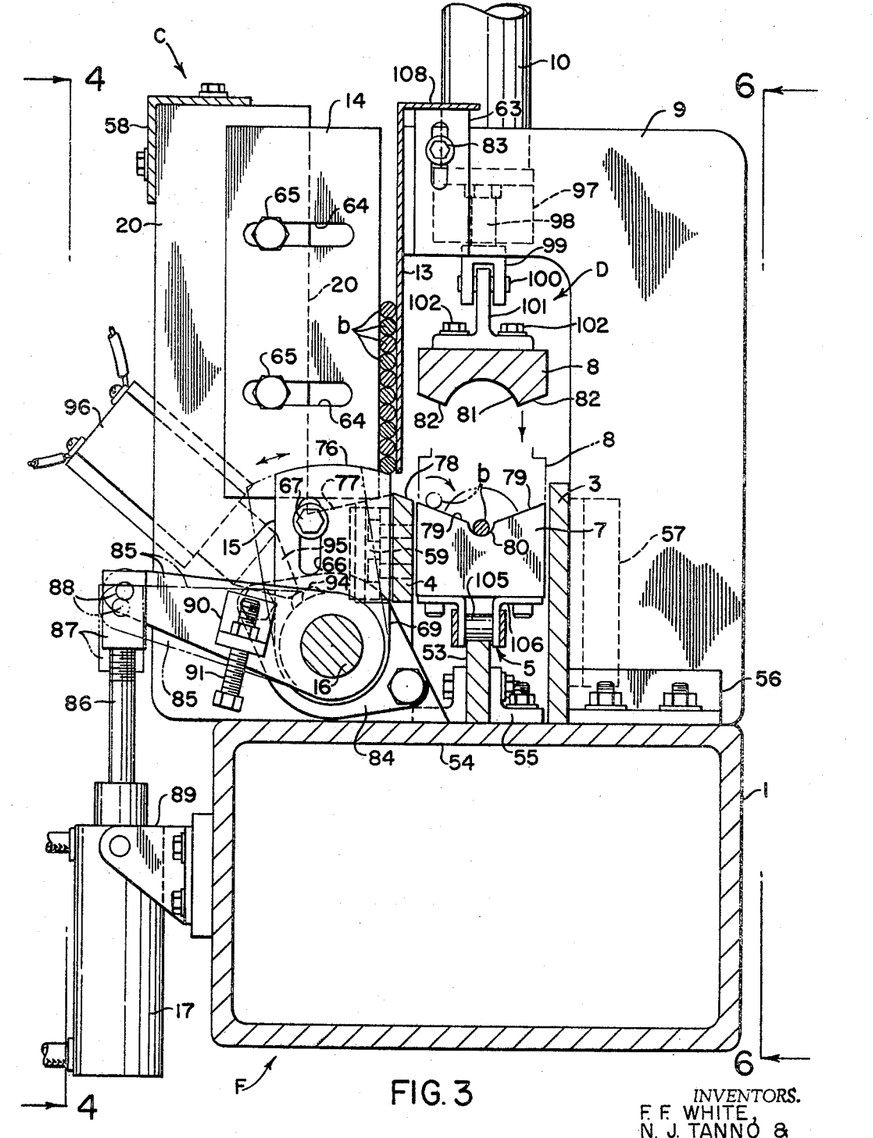
FIGURE 3 is a vertical sectional view taken substantially on the line 3—3 of FIGURE 1 and on a larger scale, moved positions of the parts being shown in dot dash lines.
Figures 4, 5:
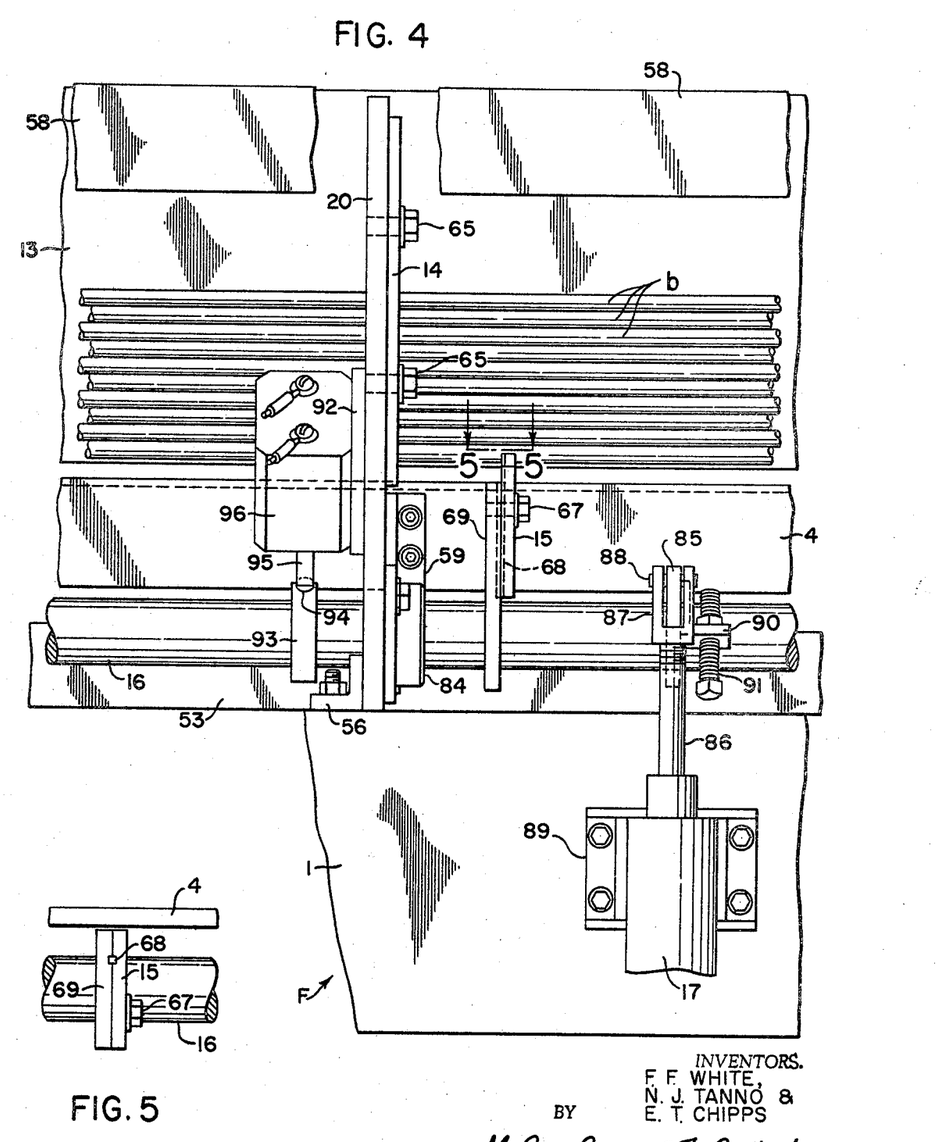
FIGURE 4 is a fragmentary side elevational view taken on the line 4—4 of FIGURE 3 with parts broken away.
FIGURE 5 is a fragmentary top view taken substantially on the line 5—5 of FIGURE 4.

Referring more particularly to the drawings which are drawn substantially to scale and in which like parts are identified by the same numerals throughout the several views, FIGURES 1 and 2 show generally how the bar and tube feeder of this invention may be mounted on a long narrow frame F. Such frame has a unique construction which permits spacing of the legs a great distance apart without unduly weakening the frame. This is made possible by use of a box beam 1 having a length of at least 10 feet and a uniform rectangular cross section as indicated in FIGURE 3. While beams of this type have been available to building contractors for many years prior to this invention, it was not previously appreciated how such beams would improve the construction of long machines of the type disclosed herein. The box beam 1 provides an excellent support when used in connection with two legs 2, a third central leg being unnecessary unless the beam is much longer than that of the machines shown herein with respect to the height of the beam.

A pair of flat parallel side rails 3 and 4 are rigidly mounted on the frame F in vertical positions parallel to the beam 1 and preferably extends substantially the full length of said beam. An endless conveyor in the form of a continuous roller chain 5 is located midway between the side rails and is driven by a drive assembly E having a reversible vane-type air motor 6 of conventional construction. A series of carriers 7 are detachably connected to the roller chain 5 at spaced locations along the length of the chain to provide generally V-shaped grooves for receiving bar stock or tubular members to be machined. A capping assembly D is provided having a capping bar 8 mounted above the carriers 7 and lowered into engagement with the carriers to prevent whipping of the bar stock during the machining operations, the lowermost position of the capping bar being shown in dot-dash lines in FIGURE 3.

The capping assembly D is supported on the box beam 1 by a series of regularly spaced L-shaped vertically supporting plates 9 which are rigidly attached to the box beam and to the side rail 3. The capping bar 8 is moved upwardly and downwardly by a pair of pneumatic cylinders 10 mounted on two of the plates 9. The three remaining plates 9 are provided with square guide blocks 11 above the bar 8 with internal vertical bores which receive vertical cylindrical guide rods 12, said rods being rigidly connected to the bar 8. As herein shown the cylinders 10 are mounted on the outermost plates 9, but this is not essential.

A flat rectangular gate 13 is rigidly mounted on the supporting plates 9 in a vertical plane parallel to the sides of the box beam and perpendicular to the plates 9, said gate being adjustable vertically in accordance with the width or diameter of the bar stock being fed into the machine. The gate 13 preferably extends the full length of the bar stock and, in conjunction with the adjustable guide plates 14, holds a vertical stack of bars or tubes for feeding one at a time into the feeder.

The escapement assembly C is best shown in FIGURE 3 and includes a series of escapement fingers 15 spaced along the length of the gate 13 and mounted on a long rock shaft 16 which extends parallel to the side rail 4. Such rock shaft is actuated in opposite directions by means of an air cylinder 17 which is mounted on the side of the box beam.

After an individual bar $b$ is fed by the escapement assembly C to a position on the carriers 7 directly above the chain 5, air is supplied to the motor 6 to advance the carriers 7 toward the automatic screw machine B or other machine receiving the work. Suitable pushing machines such as an externally cylindrical pusher rod 18 are mounted on th chain 5 to the rear of the carriers 7 for gripping the bar stock and advancing it in unison with the chain. A detachable feed finger assembly 19 is provided at the end of the pusher rod for gripping the end of the bar stock and for advancing and retracting the bar.

Figure 14:
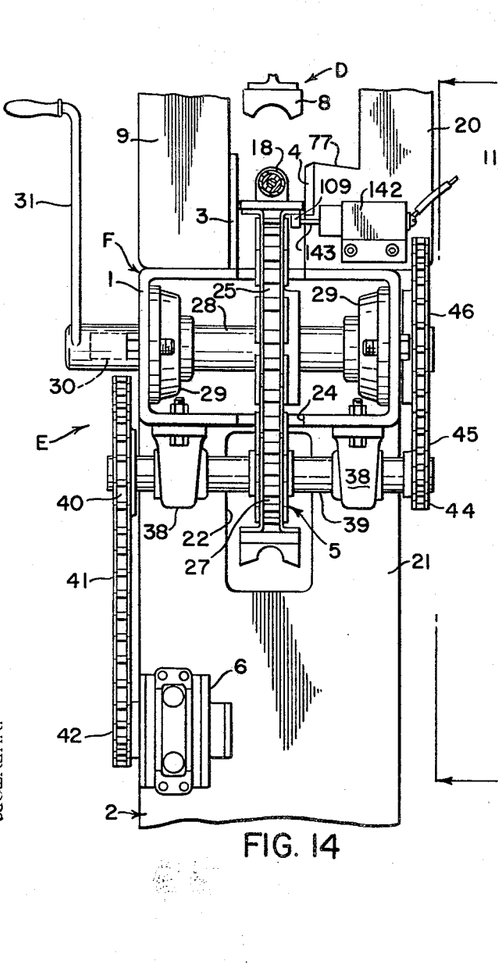
FIGURE 14 is an end elevational view taken on the line 14—14 of FIGURE 1 and on a larger scale with some of the carriers omitted.

The details of construction of the frame F will become apparent from the drawings, particularly FIGURES 1, 2, 14 and 15. Each leg 2 has a main wall or web 21 extending laterally of the beam 1, such web being provided with a substantially rectangular opening 22 for receiving the bottom portion of the chain 5 and the carriers thereon as shown in FIGURE 14. Each leg is in the form of a channel and has two tapered side flanges 23 which increase in width in an upward direction. The box beam 1 has end slots 24 at its opposite ends for receiving the main sprockets 25 and 26 of the conveyor. In the first embodiment of FIGURES 1 to 15 the sprocket shafts are located within the box beam and the lower strand of the chain 5 extends below the box beam, but it will be understood that the lower portion of the chain may be covered by a guard or located inside of the box beam as in the modification shown in FIGURES 17 and 18. In said first embodiment, a pair of small sprocket wheels 27 are rotatably mounted on the frame to guide the chain below the box beam.

At the front of the bar feeder, there is a main sprocket shaft 28 rotatably mounted in the box beam by a pair of bearings 29, the main sprocket 25 being rigidly mounted on said shaft 28. Said shaft has a square end portion 30 projecting outwardly from the side of the box beam to permit manual rotation of the shaft by means of a tool or a removable crank handle 31.

At the rear of the bar feeder, there is provided a stationary horizontal shaft 32, the sprocket 26 being rotatably mounted on said shaft by suitable bearings. The opposite ends of the shaft 32 are rigidly mounted in square guide blocks 33 by set screws 35a, said blocks being adjustable horizontally between horizontal guide plates 34 by adjusting screws 35 extending through internally threaded bosses 135 which are rigidly mounted on opposite side of the box beam. Thus, the tension in the chain 5 can be adjusted by the screws 35 to change the position of the shaft 32 after loosening the locking nuts 136.

A pair of supporting blocks 36 are rigidly mounted on the bottom of the box beam 1 to support the opposite ends of a stationary horizontal shaft 37, the idler sprocket 27 being rotatably mounted on said shaft by suitable bearings at the hub.

The idler sprockets 27 at the front of the machine is rotatably supported on the horizontal shaft 39 in a somewhat similar manner, but bearings 38 are provided to permit rotation of the shaft 39 independently of the sprocket 27. A relatively large sprocket wheel 40 is mounted on one end of the shaft 39 to receive a drive chain 41, whereby said sprocket is driven by the lower sprocket 42 carried by the shaft 43 of the air motor 6.

A small sprocket 44 is located on the end of the shaft 39 at the opposite side of the frame to receive a drive chain 45 which extends around the larger upper sprocket 46 that is rigidly mounted on the shaft 28. Thus, the main shaft 28 of the conveyor is driven by the air motor 6 through chains and sprockets of the drive assembly E shown in FIGURES 14 and 15.

Such air motor may be controlled in various ways to effect advancing and retracting of the chain 5 at relatively high speeds. The controls for the air motor preferably include a reversing valve 50 controlled by a pair of solenoids 51. It is also preferable to provide metering valves 52 in the feed lines to the air motor which can be adjusted independently to control the speed of advancing or retracting of the chain. The reversing valve 50 preferably is of the balanced type having a central position wherein flow to and from the motor is cut off.

As the motor 6 drives the roller chain 5 at relatively high speeds, it is deisrable to guide the chain. Also, it is desirable to prevent sagging of one or both flights of the chain by use of suitable guide bars or the like. As herein shown, a flat horizontal supporting bar 53 is rigidly mounted on the flat horizontal top wall portion 54 of the box beam 1 by angle brackets 55. Such supporting bar 53 has a flat upper surface for engaging the rollers of the roller chain 5 and preferably extends substantially the full distance between the sprockets 25 and 26.

As shown in FIGURE 3, the bar 53 and the upper portion of the chain 5 are located substantially in a vertical plane midway between the side rails 3 and 4. Said side rails are rigidly mounted on the frame F and are held in position by the flat transverse supporting plates 9 and 20 which are spaced along the length of the box beam on opposite sides thereof as shown in FIGURES 1 to 3. Each plate 9 is preferably substantially in lateral alignment with the flat lateral plate 20 so that each flat guide plate 14 is directly opposite the adjacent plate 9. The plates 9 and 20 are rigidly attached to the box beam by suitable means such as angle brackets 56. The side rail 3 is rigidly attached to the supporting plates 9 at spaced locations along the length of the box beam by vertical angle brackets 57. The side rail 4 is rigidly attached to the supporting plates 20 in a similar manner by vertical angle brackets 59. If it is desired to strengthen the machine, the upper portions of the plates 9 and 20 may be connected to a longitudinal supporting member. As herein shown, a horizontal reinforcing angle 58 extends the full length of the escapement assembly C and the capping assembly D and is rigidly connected to each of the plates 20.

The escapement assembly C may be adjusted to handle bar stock of various sizes and shapes or hollow tubes with widths or diameters which vary considerably. For example, a small machine of the type shown in the drawings could handle bars or tubes with diameters anywhere from $\frac{1}{16}$ inch to $1\frac{1}{2}$ inches or so. Of course, changing the size of the bar stock requires adjusting the positions of the gate 13, the guide plates 14 and the escapement fingers 15. Such adjustment can be effected in various ways. As herein shown, the gate 13 is adjustably supported by brackets 63 rigidly connected to its top flange 108 and adjusting screws 83. The various guide plates 14 of the escapement assembly are provided with elongated horizontal slots 64 for receiving adjusting screws 65 that screw into the supporting plates 20. The finger 15 has a vertical slot 66 which receives an adjusting screw 67 screwed into the base portion 69 of the escapement finger which is rigidly attached to the rock shaft 16. A vertical guide key 68 is preferably provided in keyways of the parts 15 and 69 to permit vertical sliding and to prevent turning of the finger 15 during adjustment thereof.

Figures 6, 6A:
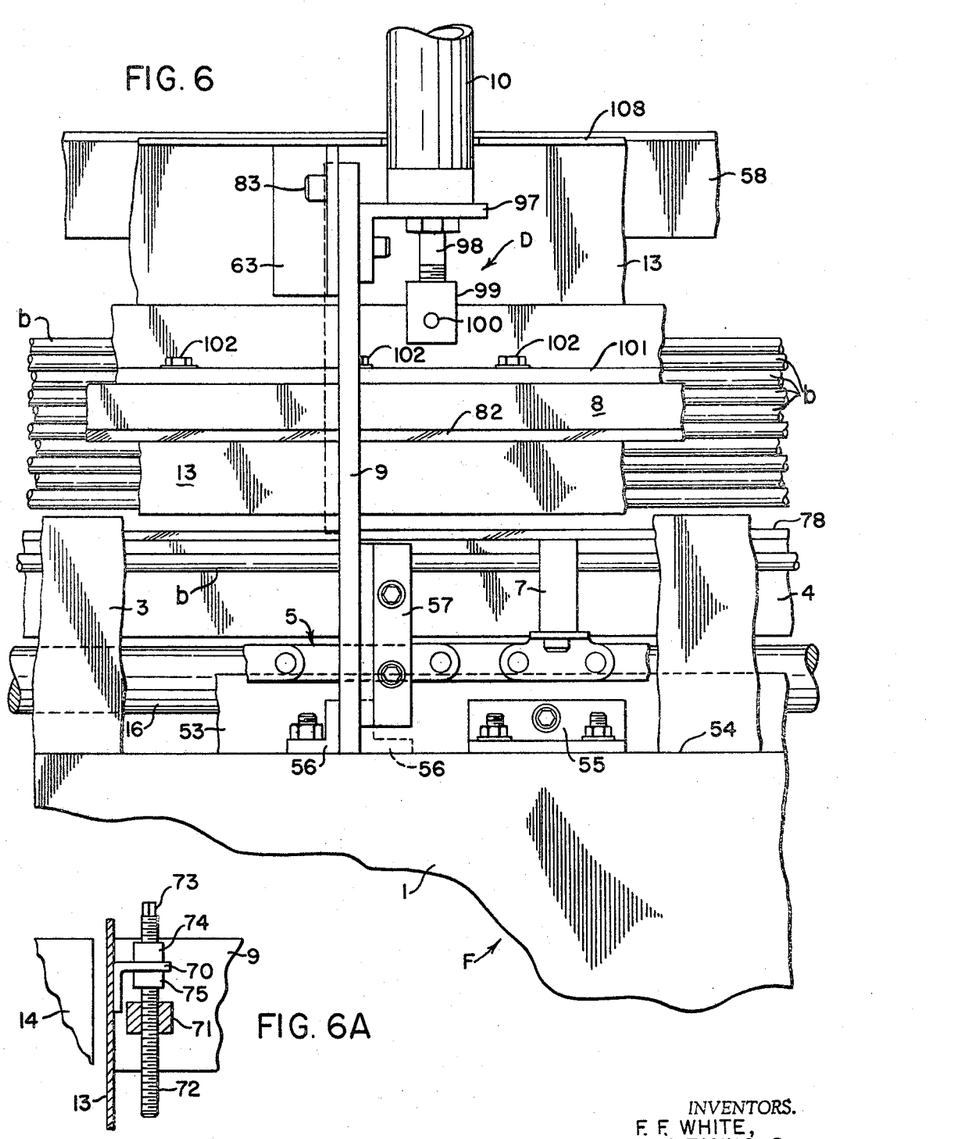
FIGURE 6 is a fragmentary side elevational view taken substantially on the line 6—6 of FIGURE 3 with parts broken away.
FIGURE 6A is a fragmentary sectional view similar to FIGURE 3 showing a modified form of adjusting means for the gate 13.

Instead of providing slots and adjusting screws (83) similar to those used on the plates 14 and the fingers 15, it is preferable to provide adjusting means for the gate 13 which are easier to operate. This is due to the weight of the gate which makes it more difficult to make the adjustment. Each of the plates 9 is preferably provided with adjusting means as illustrated in FIGURE 6A. Such means includes an angle bracket 70 welded to or otherwise rigidly connected to the gate 13 to support the gate. The upper portion of each plate 9 has a boss 71 rigidly mounted thereon below the angle 70, such boss being internally threaded to receive an adjusting screw 72. Such screw has a square tool-receiving head 73 and a pair of internally threaded nuts or collars 74 and 75 for engaging the upper and lower horizontal faces of the angle 70. Said collars are held on said screw by set screws, not shown, and may be adjusted on the screw 72. Where the diameter or width of the bar stock $b$ varies, more than one inch, the adjusting means for the gate 13 should permit moving such gate more than one inch to a position high enough to permit feeding of the bars onto the carries 7 and low enough to prevent more than one bar from leaving the escapement mechanism.

Figure 16:
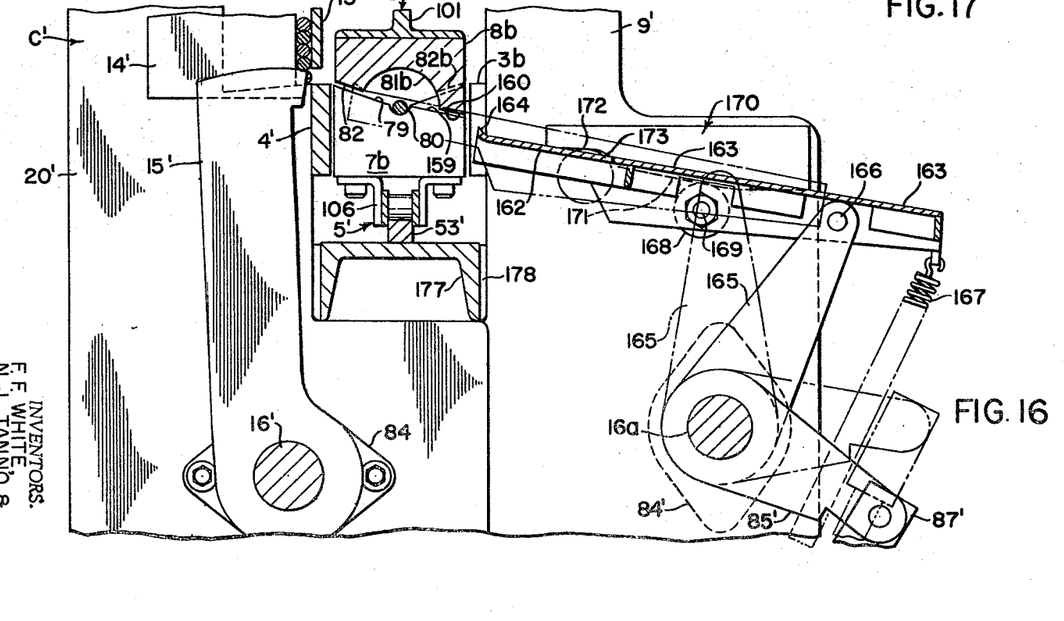
FIGURE 16 is a fragmentary transverse sectional view showing a modified form of the invention including means for ejecting the bar or remnant from the side of the machine, the unloading position of the ejector tray being shown in dot-dash lines.

As shown in FIGURE 3, the lowermost bar $b$ of the stack rests on the rounded upper surface 76 of the escapement finger 15. When the finger 15 is retracted to permit dropping of the lower bar $b$ and is returned to its original position to push said bar under the gate 13, such lowermost bar rolls over the sloped upper surface 78 of the side rail 4 and over the sloped upper surfaces 79 of the carriers 7 into the semi-cylindrical notches 80 midway between the side rails 3 and 4. In the case of a larger bar with a radius greater than that of the notch 80, such bar rests on the sloping surfaces 79 and is likewise held midway between the side rails. The same is true when some of the carriers 7 are replaced with carriers 7$b$ as shown in FIGURE 16. After the bar has been so located on the carriers, the capping bar 8 is lowered so that its sloped surfaces 82 engage the surfaces 79 on opposite sides of the bar, said surfaces 82 having the same inclination as the surfaces 79. The internal cylindrical surface 81 of the capping bar 8 must have a radius sufficient to receive the bars $b$ and sufficient to permit movement of the pusher rod 18 under the capping bar. The surface 81 is preferably coaxial with the pusher rod when in its lowermost position as shown in dot-dash lines in FIGURE 3.

When the feed finger 15 is retracted, all of the bars $b$ in the stack drop vertically a short distance which may be only half the diameter or width of each bar. The lowermost bar drops into contact with the inclined surfaces 77 of the plates 20 at spaced locations along the length of the bar. Such surface 77 slopes downwardly away from the carriers 7 as shown in FIGURES 3 and 14 to prevent the bars $b$ from cascading and rolling under the gate 13 while the finger 15 is retracted. Such slope is particularly important to insure reliable operation of the escapement mechanism when the stack of bars is high.

The feeding of the individual bars under the gate 13 to the carriers on the conveyor chain is controlled by suitable means associated with a rock shaft 16 which is rotatably mounted on the plates 20 by a series of bearings 84. A lever arm 85 is rigidly connected to the shaft 16 to effect rocking thereof and is actuated by the piston rod 86 of the pneumatic cylinder 17, said rod being attached to the lever 85 by a pivotal connection 87 having a horizontal pivot pin 88. The cylinder 17 is pivotally mounted on the box beam 1 by a supporting bracket 89 so that the cylinder 17 can effect the desired movement of the shaft 16. The amount of movement of such shaft is preferably adjusted in accordance with the size of the bar stock so as to eliminate unnecessary movement of the feed finger. As herein shown, an angle bracket 90 is rigidly mounted on the lever 85 and is internally threaded to receive an adjusting screw 91 whose head engages the top of the box beam when the escapement finger is retracted. Such screw may be adjusted so that the head thereof stops the retraction of the finger 15 just after it moves out of engagement with the lowermost bar $b$ of the stack.

An adjustable cam 93 is rigidly mounted in adjusted positions on the rock shaft 16 by a set screw and has a protruding portion or button 94 which engages the nose portion of a cam follower 95 to actuate an interlock switch 96 which is mounted in an inclined position on the plate 20 by an attaching plate 92.

When the escapement mechanism C is in operation and pneumatic fluid is admitted to the motor 17 to lower the piston rod 86, the lever 85 swings downwardly until the head of the adjusting screw 91 strikes the top of the box beam 1. At the end of this movement, the cam button 94 actuates the follower 95 of the interlock switch 96. This switch then signals the apparatus to reverse the supply of air to the air motor, and air is then supplied to the motor to elevate the piston rod 86 and swing the feed finger 15 back against the rail 4 to the position shown in solid lines in FIGURE 3.

The capping assembly D preferably includes two air cylinders 10 located symmetrically relative to the capping bar 8. As herein shown, these cylinders are mounted on the plates 9 at opposite ends of the escapement assembly by angular brackets 97, the piston rod 98 of each cylinder having a yoke 99 pivotally connected to a pin 100 extending through the reinforcing bar 101. Such reinforcing bar has a T-shaped cross section and is connected to the bar 8 by a large number of screws 102 spaced along the length thereof on opposite sides of the central web. Such bar 101 is also connected to the vertical guide rods 12 previously described, whereby the capping bar 8 is guide vertically by the guide blocks 11 and also by the piston rods 98.

The bar 8 may be made of a hard wood, such as maple or oak, or may be made of various synthetic resins or plastics. The bar 8 may also be made of metal or may be in the form of a solid or hollow metal member but the internal surface thereof is preferably non-metallic.

The shape of the capping bar 8 may vary in accordance with the shape of the bar stock or tubular stock fed to the feeder. The machine of this invention is best suited for handling bars or tubes of circular cross section but may be used to handle bar stock of polygonal or non-circular cross section such as flat bars, bars of square or rectangular cross section, bars of hexagonal or octagonal cross section and bars of somewhat irregular cross section. It is possible to handle triangular bars also, but feeding of such bars is more difficult.

The surface 81 must be shaped to permit movement of the pusher rod under the bar 8. It will be understood that the upper surface of the pusher rod may have various sizes and shapes in accordance with the types of bar stock being handled. It is usually preferable not to replace the capping bar 8 or the pusher rod 18 with each change in the size of the bar stock, and the apparatus shown in FIGURES 1 to 15 is intended to permit handling of a large number of different bar cross sections merely by adjusting the positions of the parts of the escapement mechanism. If there is a radical change in the shape of the bar stock, then it is relatively simple to replace the carriers 7 with carriers suitable for that particular type of bar stock (see FIGURE 18). This does not necessarily require replacing the bar 8.

Usually the bar 8 has a uniform cross section, but it will be understood that portions of the length of such bar may have a different cross section to improve or facilitate operations such as side ejection, as illustrated, for example, in FIGURE 16 which is described in more detail hereinafter. It will also be understood that the type of material need not be the same throughout the length of the bar, although the maple bar 8 shown herein extends the full length of the escapement mechanism and beyond the outermost plates 20 of that mechanism. It is desirable to have the capping bar 8 project forwardly over the discharge end of the bar feeder of this invention. The bar may extend almost to the automatic screw machine or other machine receiving the bar stock.

The conveyor chain 5 is preferably a roller chain similar to those used on bicycles and has links 103 and 104 and rollers 105 for engaging the sprockets. Such rollers engage the top surface of the supporting bar 53, whereby the upper strand of the chain is held straight above and parallel to the box beam. The links 103 may be replaced along the length of the chain by link flanges 106 of L-shaped cross section having openings therein to receive mounting screws 107. The horizontal flanges of the members 106 may thus be rigidly attached to or detached from various types of carriers located above the chain and adapted to move between the side rails, such as the members 7, 7', 7a, 7b, 146, 148 or 155. Most of the link flanges 106 of the chain 5 support the carriers 7 previously described which are spaced along the length of the chain at suitable intervals usually one foot or more, to support a bar $b$ as it is fed to the automatic screw machine.

Figure 9:
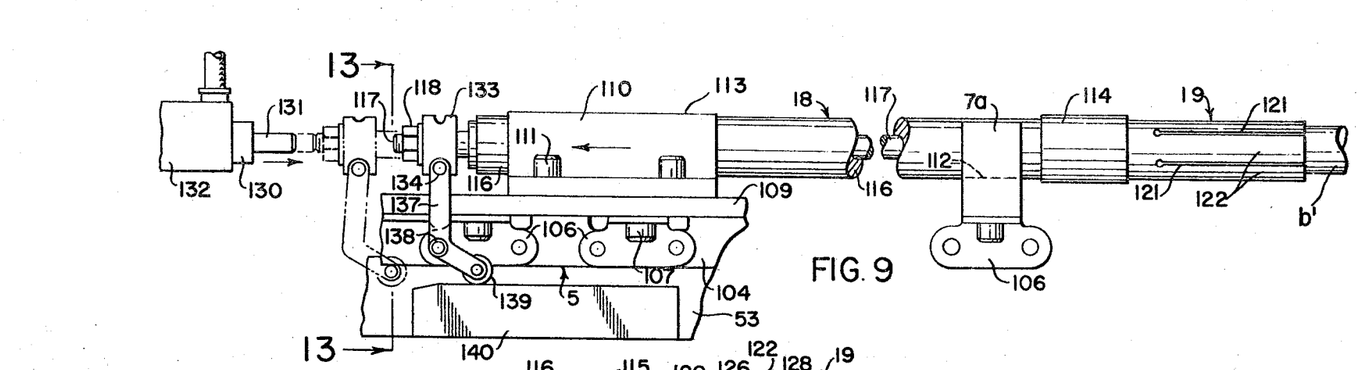
FIGURE 9 is a fragmentary side elevational view taken substantially on the line 9—9 of FIGURE 7 showing in solid lines the position of the parts as the pusher rod approaches its rearmost position and showing in dot-dash lines the position of the parts when the pusher is at its rearmost position.
Figure 15:
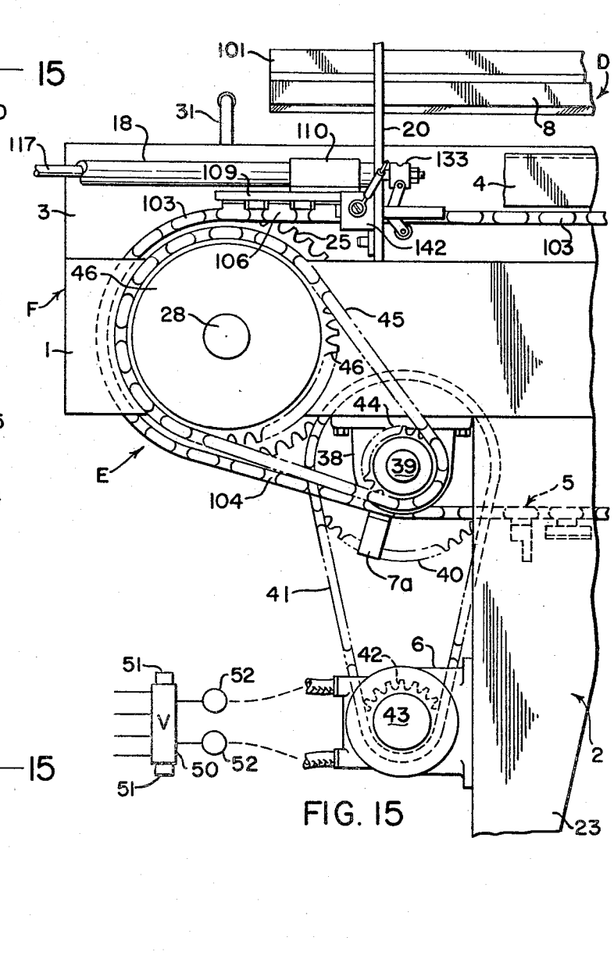
FIGURE 15 is a fragmentary side elevational view taken on the line 15—15 of FIGURE 14 and on the same scale with parts omitted and with portions of the pneumatic controls shown diagrammatically.

A pusher support block 109 is rigidly mounted on the chain 5 by a series of said link flanges 106 as shown in FIGURES 9 and 15. The main bearing housing 110 of the pusher 18 is rigidly mounted on said block 109 by screws 111. As the pusher 18 is at least several feet long in the ordinary machine in order to bridge the gap between the end of the feeder and the automatic screw machine, the relatively short block 109 is unable to hold the pusher rod in its horizontal position without assistance from other carriers. Of course, there is a limit to the length of the block 109 because of the necessity for the chain to move away from the end of the pusher rod as the pusher rod enters the automatic screw machine. One or more carriers 7a having internal cylindrical surfaces 112 of a size to fit the pusher rod are mounted on the link flanges 106 of the chain 5 to support the front end of the pusher rod as the rod moves under the bar 8. These carriers 7a are preferably located rearwardly of the removable feed finger assembly 19, although this is not essential.

Figures 10, 11, 11A, 12, 13:
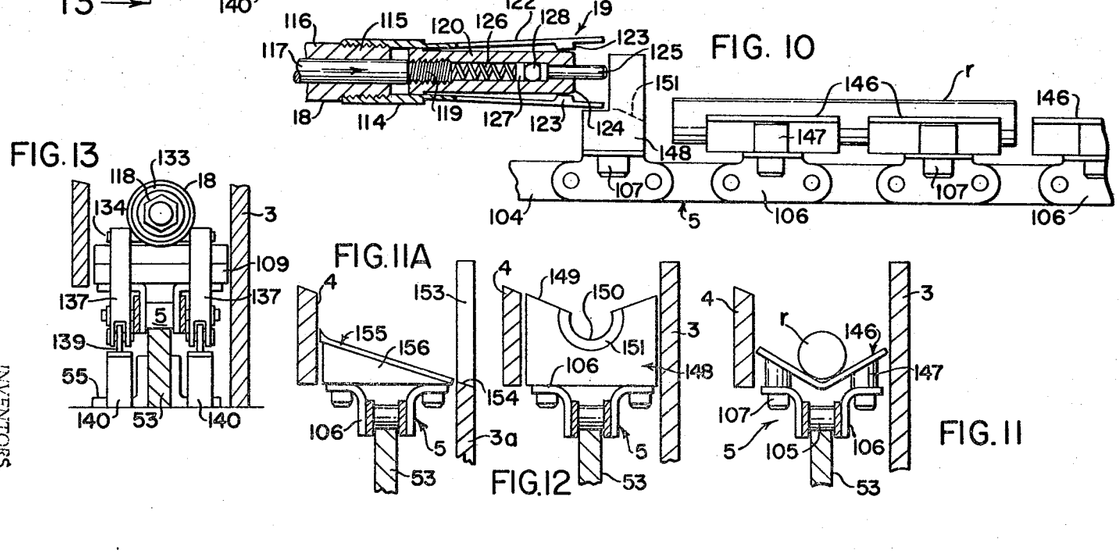
FIGURE 10 is a fragmentary side elevational view showing the feed finger and adjacent parts for catching the remnant, said finger being shown in an ejecting position.
FIGURE 11 is a fragmentary transverse elevational view showing the final position of the remnant in the remnant tray.
FIGURE 11A is a fragmentary transverse elevational view similar to FIGURE 11 showing means for ejecting remnants out the side of the feeder.
FIGURE 12 is a fragmentary transverse elevational view similar to FIGURE 11 and on the same scale showing the guide and associated parts at the discharge end of the feed finger.
FIGURE 13 is a fragmentary transverse sectional view taken on the line 13—13 of FIGURE 9 and on the same scale with parts omitted.

It will be noted that the housing 110 and the enlarged cylindrical portion 114 of the feed finger assembly have approximately the same diameter which is greater than that of any of the other parts of the pusher rod assembly. The semi-cylindrical internal surface 81 of the capping bar 8 should have a radius at least as large as that of said members 110 and 114 so that the pusher rod can move the full length of the machine without striking the cap 8. It will be understood that the feed finger assembly 119 may readily be unscrewed from the threaded end 115 of the tube 116 and replaced with another feed finger assembly of similar construction but having a different diameter. Although feed fingers are available which grip bars of different diameter, the feed fingers shown herein should be changed whenever the size of the bar stock is changed substantially. The feed fingers of FIGURE 10 are suitable for relatively large bars $b'$, it being understood that a smaller feed finger would be used for small bars $b$ of the type shown in FIGURE 3.

The tubular rod 116 forming the main portion of the pusher 18 is externally cylindrical and rotatably mounted in bearings within the housing 110 so as to permit the usual high speed rotation of the bar being machined in the automatic screw machine. The rotational speeds may be extremely high such as 10,000 r.p.m. or even 20,000 r.p.m.

It is because of these high speeds that a capping assembly is needed to prevent whipping of the bars.

The rod 116 has a central bore and receives an externally cylindrical actuating rod 117 which extends the full length of the rod 116 and has a bolt 118 screwed on the rear end of said rod. The externally threaded front portion 119 of the actuating rod is screwed into an internally threaded tubular operating member 120. The member 120 is one of the main elements of the feed finger assembly 19 and extends substantially from the end of the tube 116 to the end of the bar $b$ gripped by the feed fingers. The assembly 19 has a series of feed finger slots 121 which form a series of feed fingers 122 around the circumference of the assembly. Each feed finger has a cam shoulder 123 which engages the sloped nose portion 124 of the member 120 when that member is advanced by the rod 117. Such advancing movement wedges and spreads the fingers apart, as shown in FIGURE 10, to a released position whereby the ejector pin 125 can force the remnant $r$ of the bar stock out of the feed fingers. The central bore of the operating member 120 receives an ejector spring 126, an insert 127 and a ball 128, which engages the head of the ejector pin 125. The spring biases the ejector pin forwardly and is compressed when the pusher rod is advanced by the chain against the end of the bar stock in the carrier 7.

The rod 117 is actuated when the pusher 18 is at or near its rearmost position to effect opening of the feed fingers and ejection of the remnant. Instead of backing the rear end of the rod 117 against a stationary object when the pusher is retracted, it is preferable to effect opening of the feed fingers by energizing a suitable actuator, such as an air cylinder. As herein shown, an air actuating cylinder 130 having a housing block 132 is mounted in a fixed position at the rear of the machine. The piston rod 131 of this cylinder is advanced against the end of the rod 117 to effect opening of the feed fingers and ejection of the remnant at a predetermined time. The block 132 is rigidly mounted between the side rail 3 and the widened portion 4a of the side rail 4. These portions of the side rails at the rear of the machine are held in position by the angle brackets 62 as shown in FIGURES 7 and 8.

An annular actuating collar 133 may be rigidly mounted on the actuating rod 117 to assist in closing the feed fingers after the pusher 18 is advanced against the end of the bar stock. A transverse pin 134 is located in the annular groove of the collar 133 and is held in such groove by a pair of bell crank levers 137 pivotally mounted on the chain 5 by pivots 138 coaxial with the roller 105 of the chain. A cam roller 139 is rotatably mounted on the lower bifurcated portion of each lever 137 as shown in FIGURE 13, each cam roller being engagable with the upper cam surface of a cam block 140 mounted on the box beam to effect closing of the feed fingers as the pusher is advanced.

A limit switch 142 is rigidly mounted on the transverse plate 20 at the front of the feeder as shown in FIGURES 14 and 15, said switch having a plunger 143 engageable with the pusher block 109 to initiate retraction of the pusher when the bar stock in the screw machine B has been depleted. When the limit switch 142 signals that the pusher has reached the forward limit of its travel, the solenoids 51 of the valve 50 are energized to initiate reverse rotation of the air motor 6, thereby driving the chain 5 in a direction to retract the pusher and remove the remnant $r$ from the automatic screw machine.

Figure 7:
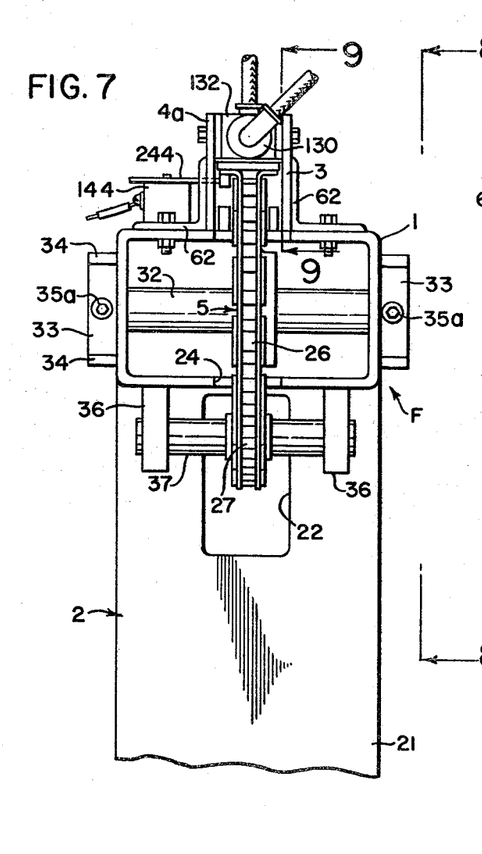
FIGURE 7 is a fragmentary end elevational view taken substantially on the line 7—7 of FIGURE 1.
Figure 8:
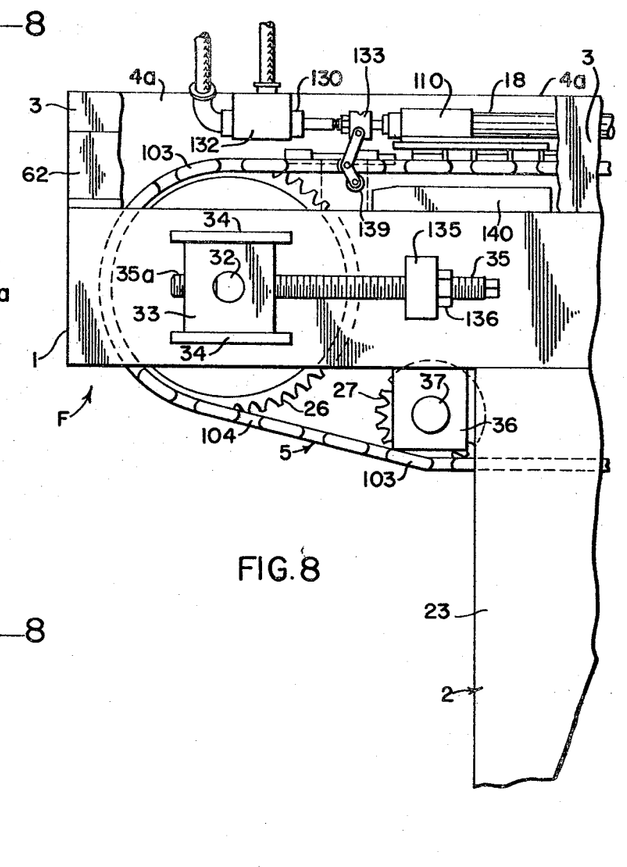
FIGURE 8 is a fragmentary side elevational view taken on the line 8—8 of FIGURE 7 and on the same scale.

As the retracting pusher approaches the air cylinder 130 and the position shown in FIGURE 9, the pusher block 109 strikes the arm 244 of the limit switch 144, which is mounted on the box beam 1 near the cam blocks 140 as shown in FIGURES 1 and 7. This limit switch is so located that the pusher 18 will coast to a stop adjacent the piston rod 131 of the air cylinder as shown in dot-dash lines in FIGURE 9. Thus, when the limit switch 144 signals that the air supply to the motor 6 should be discontinued, the solenoids 51 of the valve 50 are de-energized so that the valve 50 returns to a central cutoff position to cut off the flow of air to and from the air motor 6.

Of course, the inertia of the pusher 18 and the other parts can cause the pusher to move several inches. Such movement could be arrested by allowing the rear end of the rod 117 to strike a stationary stop, buffer or cushion, but it is preferable to effect opening of the feed fingers 122 by providing the air cylinder 130 to drive the rod 117 forwardly. If desired, the cylinder 130 may also be constructed to cushion the stopping movement of the pusher at the end of its retraction. However, this is not too important unless the feeder is of a heavy type for handling very large bars.

FIGURES 10 and 11 show how the machine of FIGURES 1 to 15 may dispose of the remnants r. As shown therein, one or more V-shaped remnant trays 146 are mounted on the link flanges 106 to catch and support the remnant r as it is ejected from the feed finger assembly 19. Each remnant tray has a pair of support blocks 147 which fit on the horizontal portions of the flanges 106 and are held in place thereon by the screws 107.

It will be seen that the tray 146 is located to support the remnant r midway between the side rails 3 and 4 with its upper surface below and out of the path of movement of the next bar b fed into the carriers 7 by the escapement assembly C. Thus, when such bar b is gripped by the device 19 and fed by the chain 5 into the automatic screw machine B, the remnant r moves in unison with such bar and drops off the remnant trays and off the feeder A as such remnant trays pass over the sprocket 25. The machine of this invention thus ejects the remnants at the front of the machine after they have been placed in the remnant trays near the rear of the machine. This is a simple and very effective means of disposing of remnants which are not too long to be ejected between the screw machine B and the feeder A.

It is preferable to provide adjustable or replaceable guide means on the chain 5 near the discharge end of the feed fingers 122 to assist in guiding the remnant out of the feed fingers and to assist in guiding the end of another bar b into the feed fingers as the pusher 18 is advanced against the end of such bar. As shown in FIGURES 10 and 12, a guide block 148 is mounted on the link flanges 106 of the chain 5 in a position adjacent the ends of the feed fingers, such block having flat sloped upper surfaces 149 for engagement with the sloped surfaces 82 of the capping bar 8 and having a semi-circular opening 150 with a diameter somewhat greater than that of the bar b' which corresponds substantially to the internal diameter of the bar-receiving opening at the end of the assembly 19 when the feed fingers are in the fully open position as shown in FIGURE 10. The opening at 150 is preferably enlarged in a forward direction to provide a frusto-conical surface 151 which guides the end of the bar b' into and out of the opening 150. Of course, the size of the opening at 150 may be adjusted or changed readily as by removing and replacing the block 148.

While the machine of FIGURES 1 to 15 is shown as it might be constructed when remnant trays were being used, it will be understood that such trays may be omitted where the remnants are disposed of in other ways before the pusher 18 is retracted. Also, it may be best to omit the remnant trays if the remnant is too long to permit ejection from the trays at the front of the feeder. It will be understood that two or more trays 146 may be used to handle longer remnants. However, where the remnants have a length greater than 5 feet or where it is proposed to eject long machined bars, it is often preferable to employ side ejection. The machine of this invention has a distinct advantage over previously known machines because it makes it relatively simple to effect side ejection without increasing the overall length of the machine or the length of the chain 5.

FIGURE 11A shows one way in which side ejection may be accomplished in a machine of the type shown in FIGURES 1 to 15. The only change necessary is to replace the side rail 3 with a side rail 3a and to replace the trays 146 and some of the carriers 7 with sloping ejector trays 155. The side rail 3a is cut away at the sides of the trays 155 to provide a rectangular ejection opening 153 but is otherwise the same as the side rail 3. The surface 154 at the bottom of the opening 153 is preferably sloped as shown in FIGURE 11A to fascilitate rolling or sliding of the bar or remnant out of the machine. Thus, one and preferably at least several sloping ejector trays 155 may be placed end-to-end directly in front of the pusher 18 to effect removal of very long bar remnants. There is, of course, a limit to the number of ejector trays which can be used because the main portion of each bar b fed to the machine should be supported by the carriers 7 or similar carriers.

If desired, the ejector opening 153 may be retained in the feeder A even when using the remnant trays 146, in which case it would be a simple matter to remove the trays 146 and replace them with the ejector trays 155 for side ejection.

As herein shown, each tray 155 is mounted on a tapered support block 156 that is detachably connected to the link flanges 106, but it will be apparent that many other forms of ejector trays could also be used.

The machine B shown in FIGURE 1 is a well-known turret-type automatic screw machine. Machines of this type include as standard mechanism a hollow rotating spindle in the head of the machine through which the bar stock to be machined is fed step by step, a collet at the inner end of the spindle gripping and releasing the bar stock. As herein shown, the machine B has a head 48 covering the spindle, an electric motor 47, a collet 60 at the end of the spindle and an operating handle 61 for controlling operation of the machine and opening and closing the collet. Such operating handle may be operated manually and may also be operated automatically by an air cylinder 49. As in conventional machines, there is a stop carried by the turret movable into the path of the end of the bar stock to limit the feeding of the bar beyond the collet when open to a predetermined distance. There may also be a conventional swing stop on the head operated by the collet.

When the air cylinder 49 is actuated to open the collet 60 at the beginning of a cycle, the air motor 6 is put into operation to advance the chain so that the bar stock is advanced against the stop on the screw machine. The bar is then advanced in increments during the machining operations until the bar is used up, the forward end of the pusher entering the spindle of the machine B and being supported by that machine before all of the carriers 7a move out of engagement with the pusher. The incremental movement of the chain by the air motor 6 may be controlled by a switch actuated from a cam on the screw machine. This is a conventional control. At the end of the screw machine operations, a second switch on the screw machine stops the screw machine with its collet 60 in an open position, and in timed sequence the air motor 6 is reversed.

The remnant remaining at the screw machine can often be ejected at the screw machine but is preferably retracted by the feed fingers 122 and ejected after the pusher reaches its rearmost position and just before the next bar is fed into the carriers.

FIGURE 16 shows another way in which side ejection can be effected in a feeder of the type shown herein. In this modification, the basic features of the bar feeder A are the same but some of the carriers 7 are replaced with carriers 7b and a side ejection apparatus is added to lift each remnant r out of the machine after it has been released by the feed fingers 122. If a side rail 3b similar to the rail 3 is to be retained it would, of course, have to be shortened or cut away like the side rail 3a so as not to interfere with the side ejection. The advantage of the apparatus of FIGURE 16 over that of FIGURE 11A is that there is support for the rear portion of the bar b during the machining operation. Also, the arrangement of FIGURE 16 is suitable for handling removal of relatively long bars or remnants which extent more than half the length of the escapement assembly C or C'. In fact, the arrangement of FIGURE 16 can be used where all of the carriers 7 are replaced with carriers similar to 7b to permit side ejection of bars extending the full length of the escapement assembly.

As shown in FIGURE 16, the carrier 7b is essentially the same as the carrier 7 and has the same sloping surface 79 and semi-cylindrical central notch 80, but the upper portion on one side of said notch is cut away to provide a downwardly sloping surface 159. If desired, the capping bar 8 of the assembly D may be replaced with a capping bar 8b of an assembly D2 having a tapered surface 160 parallel to the surface 159 which engages and fits said surface 159 when the cap 8b is lowered against the carriers 7 and 7b. Of course, the surface 160 terminates rearwardly of the carriers 7 which appear in the background in FIGURE 16, said cap 8b having a surface 82b of the same slope and elevation as the surface 82 so as to fit the underlying surfaces 79 of the carriers 7 rearwardly of the carriers 7b. It will be understood that the projection at 160 is not essential and that the cap 8 need not be modified when the carriers 7b are used. The projection at 160 can be useful, however, in preventing whipping and in holding the remnant on the carriers as the pusher is retracted.

The side ejection apparatus is shown schematically in FIGURE 16 and comprises a sloping ejector finger 162 having a flat sloping unobstructed upper surface 163 for receiving the bars or remnants ejected from the carriers 7b and causing them to roll downwardly and outwardly away from the side of the feeder. If desired, the finger 162 may be provided with a sharply inclined end portion 164 to facilitate ejection of the bars, but this is not essential.

It is desirable to move each ejector finger 162 laterally from a position out of the path of movement of the carriers 7b and the pusher to a position under the bar or remnant after retraction of the pusher and then to move such finger upwardly to effect removal of such bar or remnant. One suitable mechanism for effecting such movement is shown in the drawings and includes a motor-driven lever arm 165 mounted on a rock shaft 16a which swings about a fixed axis to move the ejector finger 162 between the position shown in solid lines and the position shown in dot-dash lines in FIGURE 16. The shaft 16a is rotatably mounted on supporting plates 9' by bearings 84' and is swung back and forth by suitable actuating means having a lever 85' and a pivotal connection 87'. Said lever 165 is pivotally connected to said finger by a pin 166, and such finger is biased in a clock-wise direction by a tension spring 167 connected to the end of the finger. A cam roller 168 is rotatably mounted on the finger on a shaft 169 and is held by the spring 167 against the bottom cam surface of a stationery cam block 170 of a shape suitable to effect the desired movement.

As herein shown, said block has a rear cam surface 171 separated from the front cam surface 172 by a shoulder 173 whereby the end portion 164 of the finger passes below the remnant r and is not elevated until the roller 168 passes the shoulder 173. When the roller moves to the position shown in dot-dash lines in FIGURE 16, the finger 162 is elevated so that its upper surface 163 is above the surfaces 79 and 159. Thus, the bar or remnant is lifted off the carriers 7b and caused to roll laterally away from supporting plates 20' out of the machine, the cam block 170 being located out of the path of movement of such remnant.

In the apparatus of FIGURES 1 to 15 the unique arrangement of the chain-mounted carriers 7, the capping bar 8 and the pusher 18 permits changing of the carriers 7 in accordance with the shape of the bar stock for the type of remnant ejection desired without the necessity for changing the bar 8 or changing the pusher except to replace the feed fingers in accordance with the diameter and cross-sectional shape of the bar stock. As the pusher 18 moves in unison with the carriers 7 such carriers cannot interfere with operation of the pusher and need not be shaped to accommodate movement of the pusher.

The capping assembly D of FIGURES 1 to 15 is desirable because of its simplicity and reliability. It will be understood, however, that such capping assembly may be varied considerably without departing from the spirit of the invention. Thus, it is contemplated that the assembly D can be replaced with an endless-chain-type conveyor system somewhat similar to that used to move carriers 7.

Figure 17:
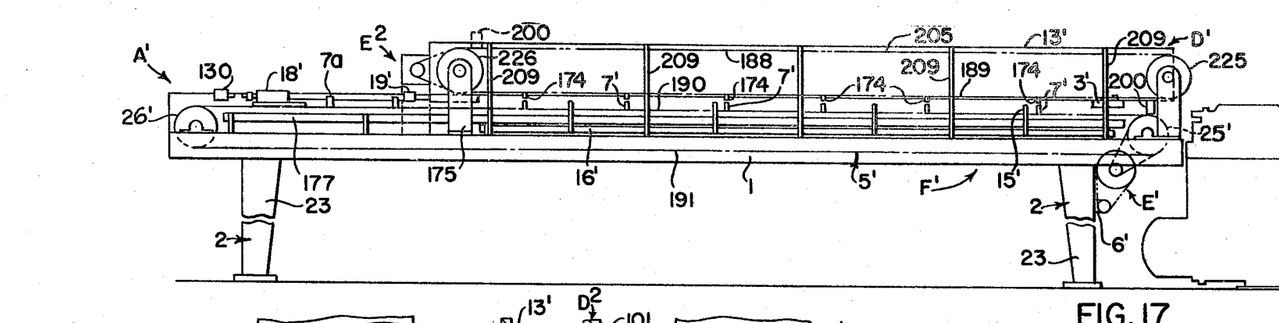
FIGURE 17 is a side elevational view on a reduced scale with parts shown schematically illustrating a modified form of the invention, the retracted position of the stop 200 being shown in broken lines.

FIGURE 17 is a partly schematic side elevational view of a bar and tube feeder A' similar to the feeder A but having a capping assembly D' of a different type. The feeder A' is basically equivalent to the feeder A and functions in a similar manner to feed bar stock to the screw machine B. The feeder A' has an escapement assembly C', a frame F', and a drive assembly E' which are somewhat different from the assemblies C, F and E respectively but function in generally the same way as will be apparent from FIGURE 18. The feeder also has a second drive assembly $E^2$ at the top of the feeder for driving the roller chain conveyor of the capping assembly D'. Said assembly $E^2$ is reversible, may be generally the same as the assemblies E and E' and may employ an air motor 6 or other suitable motors such as conventional stall-torque electric motors.

The feeder A' has side rails 3' and 4' rigidly mounted on top of the box beam 1, and the frame F' is similar to the frame F, but the frame is modified to support the conveyor chain at a higher elevation so that the lower flight of the chain is inside the box beam instead of being exposed below such beam. The roller chain 5' has links and rollers identical to those of the chain 5 and the front and rear sprockets 25' and 26' are the same as the sprockets 25 and 26, except that they are supported at a higher elevation by the supports 175. The same is true of the drive assembly E' which is the same as the assembly E except for its elevation, the air motor 6' being the same as the air motor 6 and functioning in exactly the same way to drive the chain 5' forwardly and rearwardly.

Figure 18:
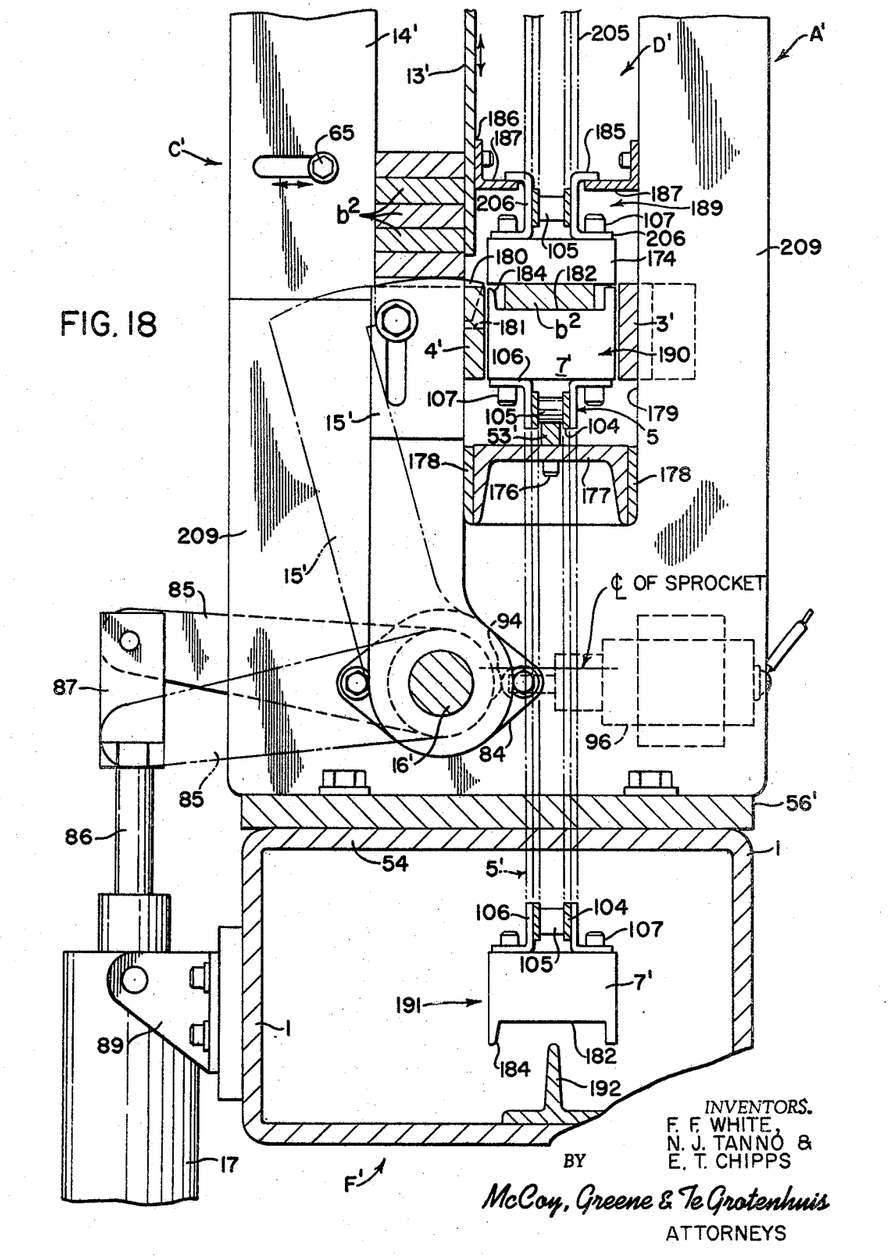
FIGURE 18 is a transverse vertical sectional view of the bar and tube feeder of FIGURE 17.

The escapement assembly C' is basically the same as the assembly C and has a flat vertically adjustable gate 13', flat laterally adjustable guide plates 14' and escapement fingers 15' which function like the corresponding elements 13, 14 and 15 of the assembly C. The escapement rock shaft 16' is operated in the same way as the shaft 16 but is located farther from the top of the escapement finger due to the elevation of the chain. Said rock shaft is rotatably mounted by bearings 84 at spaced locations along the length of the assembly C' on flat vertical supporting plates 209 which extend the full width of the box beam 1 as shown in FIGURE 18. These plates 209 replace the plates 20 and 9 of the feeder A and are spaced along the length of the escapement assembly C' in a similar manner as indicated in FIGURE 17. The central portion of each plate 209 is cut out to provide a vertically elongated rectangular opening 179 corresponding to the space between the plates 9 and 20 of the feeder A.

Reinforcing bars 178 are rigidly attached to the plates 209 and extend at least the full length of the assembly C' to reinforce the frame. The side rails 3' and 4' are also rigidly attached to the plates 209 and also extend the full length of said assembly. A channel 177 extends the full length of the bars 178 and is rigidly connected thereto to provide additional reinforcement and to provide a support for a flat bar 53' which engages the rollers 105 (like the bar 53) to maintain the upper flight of the chain 5' in a straight horizontal position. Said bar is held in position by a series of screws 176.

The lower flight of the chain 5' may also be supported in a straight position like the lower flight of the chain 205 described hereinafter but may be unsupported like the lower flight of the chain 5. The amount of sagging may be limited, for example, by providing a supporting rail or the like, such as the bar 192, which extends the full length of the box beam 1. As herein shown, such bar 192 has a T-shaped cross section and is located for engagement with sagging carriers 7' but it will be understood that rails similar to the members 187 may be provided to maintain the lower flight of the chain 5' in a straight horizontal position if desired.

In the escapement assembly C' the guide plates 14' are adjustably mounted on the plates 209. The assembly C' is capable of handling bars of circular cross section like the assembly C but is shown herein adjusted for feeding of flat bars $b^2$ of rectangular cross section, the carriers 7 being replaced with carriers 7' having a rectangular recess 182 of a size to receive each bar $b^2$. Each bar is pushed under the gate 13' by the projecting portion 180 of the escapement finger 15', the side rail 4' having slots 181 of a size to receive each of the escapement fingers, said fingers being spaced along the length of the machine like the fingers 15. The guide rail 4' has a sloped upper surface and the side flange of each carrier 7' has a curved surface 184 to facilitate sliding of each bar $b^2$ onto the carrier. When the finger 15' is retracted out of the path of movement of the bars in the stack to the position shown in dot-dash lines in FIGURE 18, the bottom surface of the lowermost bar $b^2$ drops to a position substantially in alignment with the uppermost surface of the bar 4' so that such bar $b^2$ slides onto the carriers 7' as the fingers 15' are returned to their initial positions.

Means are provided for supporting the lower flight of the endless roller chain 205 to maintain it in a straight horizontal position so that the hold-down pads 174 carried by the chain can move over the carriers 7' when the carriers are empty. As shown in FIGURE 18, the roller chain 205 is essentially the same as the chain 5 and has links 104 and rollers 105 but the links 103 are replaced by link flange members 206 of C-shaped cross section having horizontal lateral flanges 185 for engaging the horizontal upper surfaces 187 of a path of laterally aligned horizontal angle guides 186. The latter guides preferably extend substantially the full distance between the sprockets 225 and 226 of the upper roller-chain conveyor. Said sprockets 225 and 226 are rotatably mounted on the frame F' and support the roller chain 205 like the sprockets 25' and 26' so that the upper and lower flights of the chain are horizontal as shown in FIGURE 17. Thus, the lower flight of the upper chain 205 is maintained parallel to the upper flight of the lower chain 5' by the guides 53' and 186. This permits independent movement of both chains without interference between the carriers 7' and the hold-down pads 174.

When a bar $b^2$ is fed by the escapement assembly C' onto the carriers between the side rails 3' and 4', the hold-down pads 174 must be out of the path of movement of the bar entering the carriers. One solution is to provide relative vertical movement between the pads 174 and the carriers 7' as is provided for the cap 8 and the carriers 7. Thus, it would be possible to move the lower flight of the upper chain 205 vertically relative to the upper flight of the chain 5'. However, it is much easier to move the chain 205 by rotating the sprockets so that all of the pads 174 are moved to positions above the chain until the bar $b^2$ has been placed on the carriers. Thereafter, the chain 205 may be returned to its initial position as shown in FIGURES 17 and 18 wherein the hold-down pads 174 are located adjacent the carriers 7'.

Each pad may be directly above one of the carriers 7' as shown in the drawings, but this is not essential.

FIGURE 17 illustrates schematically the construction of the feeder A' so that the operation can readily be understood. As shown, the carriers 7 are mounted at spaced points along the length of the chain 5' like the carriers 7 so as to support one bar $b^2$ midway between the side rails 3' and 4' in alignment with the pusher 18' so that the rear end of said bar may be engaged and gripped by the feed fingers 19' of the pusher. Such pusher may be identical to the pusher 18, but it is preferable to omit the collar 113, the cams 140 and the associated elements used to effect closing of the feed fingers during the initial advancing movement of the planar. Such auxiliary equipment for the pusher is not needed when using the capping assembly D' since a stop 200 may be mounted on the chain 205 to engage the forward end of the bar $b^2$ and to force the rear end of said bar into the feed fingers.

As shown herein, a series of hold-down pads 174 are mounted on the lower flight 189 generally in vertical alignment with the carriers 7' or such other carriers or trays as might be employed. These pads and the stop 200 are attached to the link flange member 206 of the lower flight 189 of the chain by means of screws 107. The cross-sectional shape of the pads will, of course, depend upon the cross-sectional shape of the bar stock supplied to the machine.

The upper flight 190 of the chain 5', which supports the pusher 18' and the carriers 7' is held parallel to the flight 189 by the guide bar 53'. It will be noted, however, that the lower flight 191 of the chain 5' does not support any carriers. The upper flight 188 of the chain 205 is free of any carriers or pads. Therefore, when the air motor of the drive assembly $E^2$ advances the chain to move the stop 200 to the position shown in dot-dash lines in FIGURE 17, all of the pads 174 are located above the line of centers of the sprockets 225 and 226 and can no longer interfere with lateral movement of a bar $b^2$ from the bottom of the stack to the carriers 7'.

The sequence of operation of the bar and tube feeder A' is generally descibed below. At the beginning of a cycle, when the pusher 18' is in its fully retracted position as shown in FIGURE 17, the rock shaft 16' is actuated to effect feeding of one bar $b^2$ under the gate 13' onto the carriers 7'. During this feeding the chain 205 is positioned so that all of the pads 174 are located in the upper flight of the chain 205. After the bar is positioned on the carriers, the air motor of the drive assembly $E^2$ is operated to rapidly return all of the pads 174 to the positions shown in FIGURE 17, thereby bringing the stop 200 into engagement with the front end of the bar $b^2$. This stop forces the rear end of the bar against the feed fingers and forces the pusher against a stop at the rear of the machine, such as at 130, whereby the bar is gripped by the feed fingers. This also stops movement of the chain 205. At this instant, the drive assemblies E' and $E^2$ are operated to advance the carriers 7' and the pads 174 in unison toward the screw machine B. The stop 200 then moves over the sprocket 225 and out of the path of movement of the bar so that the bar is fed into the screw machine as is done in the feeder A of FIGURES 1 to 15. The rest of the cycle may be the same as with the feeder A. The cycle may be controlled manually but is preferably controlled automatically as will be apparent to those skilled in the art.

While the machines shown herein have frames mounted in fixed positions on the floor, it will be understood that means may be provided for moving the entire feeder laterally or transversely if this is required. Also, it is possible to omit the side rails 3 and 4 or to provide an escapement assembly C on both sides of the machine instead of one.

It will be understood that, in accordance with the patent laws, variations and modifications of the specific devices disclosed herein may be made without departing from the spirit of the invention.

Having described our invention, we claim:

1. A bar and tube feeder comprising a continuous conveyor having bar-receiving carriers mounted along the length thereof, escapement means for feeding bars individually to a central position on said carriers, a capping assembly having means movable to a position above said carriers to restrict transverse movement of the bar mounted on said carriers to prevent whipping of said bar during high speed rotation thereof, and means for advancing and retracting said conveyor.

2. A bar and tube feeder as defined in claim 1 having bar pusher means rotatably mounted on said conveyor for gripping each bar fed to said carriers and for retracting the remnant of said bar.

3. A bar feeder as defined in claim 2 wherein said capping assembly includes a capping bar shaped to receive the upper portion of said pusher means and means for moving said capping bar toward and away from said carriers to permit feeding of individual bars transversely to said carriers from one or both sides of said conveyor.

4. A bar feeder as defined in claim 3 wherein the upper surface of said pusher means is generally cylindrical and said capping bar has a generally semi-cylindrical central groove to receive said pusher means.

5. A bar feeder as defined in claim 4 wherein each of said carriers has an upper surface of generally V-shaped cross section with a narrow central groove, whereby a small bar fed to said carriers is supported in said groove and a large bar fed to said carriers is supported by the inclined surfaces on opposite sides of said groove.

6. A bar feeder as defined in claim 1 wherein said conveyor is a single endless roller chain mounted on sprockets near the opposite ends of said feeder and each of said carriers is detachably mounted on said chain, said chain being located below the central portion of said carriers.

7. A bar feeder as defined in claim 1 wherein said capping assembly comprises a continuous conveyor (205) having a series of hold down members (174) mounted thereon.

8. A bar feeder as defined in claim 7 wherein each of said hold down members is shaped to receive the upper portion of a bar on said carriers and to prevent excessive transverse movement of said bar on said carriers.

9. A bar feeder as defined in claim 8 wherein a stop (200) is mounted on the conveyor of said capping assembly for engaging the leading end of a bar on said carriers when said hold down members (174) are positioned above said bar.

10. A bar feeder as defined in claim 9 wherein said conveyor moves said stop and said hold down members from positions adjacent said bar to retracted positions wherein the capping assembly does not interfere with transverse feeding of the bar to said carriers.

11. A bar feeder as defined in claim 10 wherein the portion of the last-named conveyor adjacent said carriers is free of said stop and said hold down members when the stop is retracted.

12. A bar feeder as defined in claim 7 wherein said bar has a non-circular cross section and said hold down members are shaped to conform to the upper portion of said bar.

13. A bar feeder as defined in claim 12 wherein each of said carriers has a central recess shaped to conform to said bar.

14. A bar feeder as defined in claim 1 wherein said conveyor is mounted on an elongated frame comprising a box beam (1) of substantially rectangular cross section having a length of at least 10 feet and no more than two legs (2) for supporting the beam in a horizontal position.

15. A bar feeder as defined in claim 14 wherein a series of lateral supporting plates (9 and 20) are rigidly mounted on top of said box beam and provided with a central opening to receive said conveyor, a flat vertical gate (13) is adjustably mounted on said plates at one side of said opening to support a stack of bar stock parallel to said conveyor, a series of transverse guide plates (14) are adjustably mounted on said supporting plates (20) to hold bars of different diameter against said gate, and escapement means are provided for supporting the lowermost bar of said stack and feeding it under said gate including a vertically adjustable escapement finger (15) and means for advancing and retracting said finger laterally toward and away from said conveyor.

16. A bar feeder as defined in claim 15 wherein a reversely sloping surface (77) is provided at the bottom of said stack to support the lowermost bar of the stack when the escapement finger is retracted.

17. A bar feeder as defined in claim 15 wherein guide means (11, 12) are mounted on said supporting plates (9) to support a capping bar (8) and an air cylinder (10) is proivded for arising and lowering said bar.

18. A bar feeder as defined in claim 15 wherein side rails (3 and 4) are rigidly connected to said supporting plates (9 and 20) on opposite sides of said conveyor, the upper surface of one of said rails (4) guiding the lowermost bar under said gate.

19. A bar and tube feeder as defined in claim 14 wherein the two legs (2) are mounted directly below said box beam (1) and are spaced apart a distance several times their length, and wherein means (13) are provided for supporting a stack of long bars (*b*) parallel to the upper flight of the chain, and escapement means (15) are provided on said frame to feed the lower bar of said stack laterally to a position on said carriers parallel to said box beam, said frame, including said legs and said escapement means, being narrow and having a width only slightly greater than that of said box beam, whereby said feeder occupies a minimum amount of floor space.

20. A bar feeder as defined in claim 1 wherein said carriers have oppositely sloping upper surfaces to support one bar on said conveyor and some of said carriers have surfaces sloping downwardly toward one side of the feeder to facilitate side ejection of bar remnants.

21. A bar feeder as defined in claim 1 wherein a remnant tray is mounted on said carrier rearwardly of said carriers to receive the retracted bar remnant and to support such remnant below the next bar fed to said carriers whereby the remnant is ejected through the front of the feeder as the next bar is fed from the feeder.

22. A bar feeder as defined in claim 1 wherein a pusher rod is mounted on said conveyor, the rear end of said pusher rod being fixed to said conveyor and the remainder extending forwardly in cantilever fashion and carriers mounted on said conveyor for supporting the front end of said pusher rod, said last named carriers moving out of engagement with the pusher rod as it approaches the forward limit of its travel.

23. A bar feeder as defined in claim 1 wherein ejector fingers are mounted at the side of said conveyor for lateral movement from a position out of the path of movement of said carriers to a position under the bars on said carriers to lift the bar remnant off of said carriers and eject them laterally through the side of the feeder.

24. A bar feeder as defined in claim 23 wherein each of the ejector fingers (162) has a sloping unobstructed upper surface (163) for receiving the bars or remnants ejected from the carriers and has a sharply inclined end portion (164) to facilitate ejection of the bars, and wherein a side rail (3) is provided at the side of the conveyor with an opening to permit side ejection by said ejector fingers.

25. A bar and tube feeder as defined in claim 1 wherein said conveyor is mounted on an elongated frame comprising a long beam having a pair of upright legs for supporting the beam in a horizontal position, said beam having integral horizontal and vertical walls and providing the main reinforcing element of said frame, said conveyor has a chain mounted on sprockets near the ends of said beam, means are provided for supporting a stack of long bars parallel to the upper flight of the chain, and escapement means are provided on said frame to feed the lower bar of the stack laterally to a position on said carriers parallel to said box beam, said frame, including said legs and said escapement means being narrow and having a width only slightly greater than that of said beam, whereby said feeder occupies a minimum amount of floor space.

26. A bar and tube feeder as defined in claim 1 wherein said capping assembly includes a capping member having a recessed bottom surface shaped to receive the upper portion of said pusher means and to permit advancing movement of the pusher means relative to the capping member and means for moving said capping member toward and away from said carriers to permit advancing movement of the pusher means relative to the capping member and means for moving said capping member vertically toward and away from said carriers to permit lateral feeding of individual bars to said carriers, said conveyor is mounted on an elongated frame comprising a long beam of uniform cross section having a length of at least 10 feet and legs for supporting the beam in a horizontal position, said conveyor having a chain mounted on sprockets near the ends of said beam, each of said carriers being detachably mounted on said chain, said beam having flat integral horizontal and vertical walls and a guide bar engaging the chain to support it parallel to the beam, and pusher means are provided for gripping each bar fed to said carriers comprising a pusher rod with a length of several feet having its rear portion connected to said chain.

27. A bar and tube feeder comprising an elongated frame (F), a continuous chain conveyor (5) mounted on said frame and having bar-receiving carriers (7) mounted on the upper flight of the chain and spaced apart along the length of the chain to support a bar in a horizontal feed position, means (6) for reciprocating said conveyor to advance said bar and return the conveyor to its original position, escapement means (C) at one side of said frame for repeatedly feeding a bar laterally to a central horizontal position on said carriers, and a long narrow capping bar (8) mounted for movement on said frame from a retracted position to an advanced position above and parallel to the bar on said carriers to restrict transverse movement of said bar and prevent whipping of said bar during high speed rotation thereof, and means (10) for retracting said capping bar to permit feeding of individual bars transversely to said carriers from one or both sides of said conveyor.

28. A bar and tube feeder as defined in claim 27 wherein an elongated rotatable pusher rod (18) is mounted on said upper flight of said chain for movement in unison with said carriers, said capping bar (8) having a recessed bottom surface (81) conforming generally to the shape of the upper portion of said pusher rod.

29. A bar and tube feeder as defined in claim 27 wherein each carrier has a V-groove (79) therein to support bars of substantial diameter and a narrow central groove (80) to receive bars of small diameter, said escapement means (C) being adjustable to accommodate bars of widely varying diameter.

30. A bar and tube feeder comprising a rigid elongated frame (F), a conveyor mounted on said frame including a pair of sprockets (25, 26) and an endless chain (5) mounted on said sprockets with its upper flight in a horizontal position, a series of bar-supporting carriers (7) mounted along the length of said upper flight, an escapement assembly (C) for supporting a series of long bars or tubes (b) parallel to said upper flight and for feeding them individually to said carriers including a side rail (4) parallel to said upper flight and adjacent the path of movement of said carriers, an upright gate (13) rigidly mounted above said rail and spaced therefrom a distance slightly greater than the diameter of the bar or tube being fed to said carriers, means (63, 83) for adjusting the vertical position of said gate to accommodate bars of different diameter, means (14) for supporting a row of said bars or tubes in positions parallel to said rail, and means for feeding individual bars from said row to said carriers comprising escapement finger means (15) having an advanced position to prevent movement of a bar or tube from said row toward said rail and a retracted position to permit such movement, said escapement finger means pushing one such bar or tube between said rail and said gate to said carriers when moved from its retracted position to its advanced position.

31. A bar and tube feeder as defined in claim 30 wherein a guide member (14) holds said bars or tubes in a stack against said gate (13) to provide a gravity feed and means (65) are provided to adjust the position of said guide member to accommodate bars or tubes of different diameters.

32. A bar and tube feeder as defined in claim 31 wherein said escapement finger means (15) has means (67) for adjusting the length of the finger in accordance with the diameter of the bar or tube.

33. A bar and tube feeder as defined in claim 32 wherein said gate (13), said guide member (14) and said escapement finger means may be adjusted to effect feeding of bars with a diameter from 1/16 inch to 1½ inches.

34. A bar and tube feeder having a continuous conveyor with bar-supporting carriers (7) mounted thereon and having an improved frame for accurately positioning said conveyor comprising a large circumferentially continuous box beam (1) of uniform cross section with a length of at least 10 feet providing the main reinforcing element of said frame, said conveyor comprising an endless chain (5) mounted on sprockets (25, 26) near the opposite ends of said beam, said carriers (7) being spaced apart along the length of the chain, means for reciprocating said conveyor, upright legs (2) supporting said beam in a horizontal position, guide means comprising a narrow guide bar (53) rigidly mounted on said beam, the upper flight of said chain being guided parallel to the beam by said guide bar, said beam (1) having a width substantially greater than its height to minimize lateral deflection and to maintain said sprockets in proper alignment, escapement means ($C^1$) on said frame at one side of said chain to feed a long bar laterally to a position on said carriers parallel to said beam, and unloading means for thereafter removing the remaining bar from said carriers, said unloading means including an ejector finger (162) mounted above said beam for movement from a position out of the path of movement of said chain and said carriers to a position between said carriers in engagement with a portion of the bar.

35. A bar and tube feeder having a continuous conveyor with bar-supporting carriers (7) mounted thereon and having an improved frame for accurately positioning said conveyor comprising a large circumferentially continuous box beam (1) of uniform generally rectangular cross section with a length of at least 10 feet providing the main reinforcing element of said frame, said conveyor comprising an endless chain (5) mounted on sprockets (25, 26) near the opposite ends of said beam, said carriers (7) being spaced apart along the length of the chain, means for reciprocating said conveyor, upright legs (2) supporting said beam in a horizontal position, guide means comprising a narrow guide bar (53) rigidly mounted on said beam, the upper flight of said chain being guided parallel to the beam by said guide bar, said beam (1) having a width substantially greater than its height to minimize lateral deflection and to maintain said sprockets in proper alignment, a series of lateral supporting plates (9 and 20) rigidly mounted on top of said box beam out of the path of movement of said conveyor, a flat vertical gate (13) adjustably mounted on said plates at one side of said opening to support a stack of bars parallel to said conveyor, a series of transverse guide plates (14) adjustably mounted on said supporting plates (20) to hold bars of different diameter against said gate, and escapement means for supporting the lowermost bar of said stack and feeding it under said gate including a vertical adjustable escapement finger (15) and means (17) for advancing and retracting said finger laterally toward and away from said conveyor.

References Cited

UNITED STATES PATENTS

| | | | |
|---|---|---|---|
| 3,381,800 | 5/1968 | Everett et al. | 198—204 |
| 3,387,728 | 6/1968 | Bick et al. | 214—620 |
| 2,390,533 | 12/1945 | Hill | 29—37 |
| 2,525,305 | 10/1950 | Lombard | 214—1 XR |
| 2,598,190 | 5/1952 | Offutt | 214—1.5 |
| 2,656,859 | 10/1953 | Retz | 214—1.4 |
| 2,915,810 | 12/1959 | Taylor et al. | 214—1.5 XR |
| 3,029,957 | 4/1962 | Freeman et al. | 214—1 |

GERALD M. FORLENZA, Primary Examiner

F. E. WERNER, Assistant Examiner

U.S. Cl. X.R.

82—2.7